(12) United States Patent
Bennison et al.

(10) Patent No.: US 7,593,117 B2
(45) Date of Patent: Sep. 22, 2009

(54) APPARATUS AND METHODS FOR MEASURING WORKPIECES

(75) Inventors: Stephen J. Bennison, Bellevue, WA (US); David Foisy, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 11/611,060

(22) Filed: Dec. 14, 2006

(65) Prior Publication Data
US 2008/0144045 A1   Jun. 19, 2008

(51) Int. Cl.
*G01B 11/14* (2006.01)
(52) U.S. Cl. ..................................... 356/614
(58) Field of Classification Search ............... 356/608, 356/457, 614
See application file for complete search history.

(56) References Cited

U.S. PATENT DOCUMENTS

| | | | | |
|---|---|---|---|---|
| 4,502,785 A | * | 3/1985 | Truax | 356/608 |
| 4,534,650 A | * | 8/1985 | Clerget et al. | 356/608 |
| 5,401,979 A | * | 3/1995 | Kooijman et al. | 250/559.29 |
| 5,570,187 A | * | 10/1996 | Nihei et al. | 356/608 |
| 5,774,220 A |   | 6/1998 | Wienecke | |
| 6,973,355 B2 | * | 12/2005 | Tisue | 700/56 |
| 7,321,421 B2 | * | 1/2008 | Bennison | 356/237.1 |
| 2006/0023223 A1 |   | 2/2006 | Bennison | |

FOREIGN PATENT DOCUMENTS

WO    WO98/05157    2/1998

OTHER PUBLICATIONS

The Boeing Company International Search Report, Application No. PCT/US2007/087491, dated Oct. 7, 2008.
"Omega: Novel Optical Sensor 3d Measuring System for Complex Geometry in Adverse Environment" by E. Laso, et al. dated Jan. 1, 1995, pp. 235-245, XP002418744.

\* cited by examiner

*Primary Examiner*—Tarifur R. Chowdhury
*Assistant Examiner*—Isiaka O Akanbi
(74) *Attorney, Agent, or Firm*—Rozenblat IP LLC

(57) ABSTRACT

The invention relates to systems and methods for measuring workpieces. In one embodiment of the invention, a system for measuring a workpiece includes a plurality of measurement modules, an electronic control module, and a moveable frame to which the measurement modules are attached. Each of the measurement modules comprises at least one galvanometer, at least one mirror, and at least one optical displacement sensor. The plurality of measurement modules are collectively adapted to measure a circumference of the workpiece. In other embodiments, methods of calibration and use are provided.

23 Claims, 16 Drawing Sheets

APPARATUS AND METHODS FOR MEASURING WORKPIECES

CROSS-REFERENCE TO RELATED APPLICATIONS

This application claims priority to U.S. application Ser. No. 10/903,332, filed on Jul. 30, 2004, and titled Apparatus And Methods For Scanning Conoscopic Holography Measurements.

BACKGROUND OF THE INVENTION

Conventional manufacturing and assembly of large, complex structures, such as large commercial aircraft and the like, may involve hundreds of single purpose measurement gauges. Each such measurement gauge typically has a specific function, and when a new function is required, a new measurement gauge is designed and fabricated.

In addition, many conventional measurement gauges include an assumption about some aspect of the inspected feature's geometry. For example, a countersink diameter gauge may be based on an assumption that the hole is round, and that there are no chamfers at the edge where the conical stylus of the gauge makes contact. Such gauges typically provide accurate measurements provided that these assumptions are satisfied.

Although desirable results have been achieved using prior art measurement systems, there is room for improvement. For example, in some circumstances, the assumptions included in the operation of a measurement gauge may cause measurement errors that are unacceptable. Furthermore, because the prior art measurement gauges are specialized to a particular purpose, a large number of such gauges may be needed, adding to the overall cost and complexity of the manufacturing and assembly process. Therefore, a generic measurement system, and methods for its calibration and use, capable of acquiring a variety of different measurements without the risk of assumptive errors would be useful.

SUMMARY OF THE INVENTION

In one aspect of the invention, a system for measuring a workpiece comprises a plurality of measurement modules, an electronic control module, and a moveable frame to which the measurement modules are attached. Each of the measurement modules comprises at least one galvanometer, at least one mirror, and at least one optical displacement sensor. The plurality of measurement modules are collectively adapted to measure a circumference of the workpiece. The electronic module comprises at least one computer which is adapted to control the galvanometers and the mirrors, and which is also adapted to communicate with the displacement sensors. The moveable frame is adapted to allow the measurement modules to be moved relative to the workpiece.

In a further aspect of the invention, a method of measuring a workpiece is disclosed. In one step, a plurality of measurement modules is provided. Each of the measurement modules comprises at least one galvanometer, at least one mirror, and at least one optical displacement sensor. In another step, the measurement modules are placed substantially around a circumference of the workpiece. In yet another step, a plurality of light beams are emitted onto the workpiece using the measurement modules. In still another step, the light beams are reflected off the workpiece. In an additional step, a measurement of the circumference of the workpiece is determined based on the reflected light beams.

In another aspect of the invention, a method is disclosed for calibrating measurement modules for measuring a workpiece. In one step, a single measurement module is attached to a moveable component. The single measurement module comprises at least one galvanometer, at least one mirror, and at least one optical displacement sensor. In another step, a laser spot emitted from the sensor is directed off the mirror and into a camera. In still another step, the mirror is rotated using the galvanometer to redirect the laser spot. In an additional step, the single measurement module is moved into multiple configurations relative to the camera. In yet another step, spot positions are determined in which the laser spot hits the camera at each of the multiple configurations. In still another step, the spot positions are calibrated relative to input voltages of the galvanometer at each of the spot positions. In another step, the laser spot is swept over a reference piece. In an additional step, path lengths of the laser spot to the reference piece are determined for varying input voltages. In yet another step, the path lengths are calibrated relative to the varying input voltages.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention relates to measuring or otherwise analyzing characteristics of a workpiece. While details of certain embodiments are described and shown, other embodiments may be used, including some embodiments that omit some details from the embodiments that we choose to describe as representative of the present invention.

Figure 1:
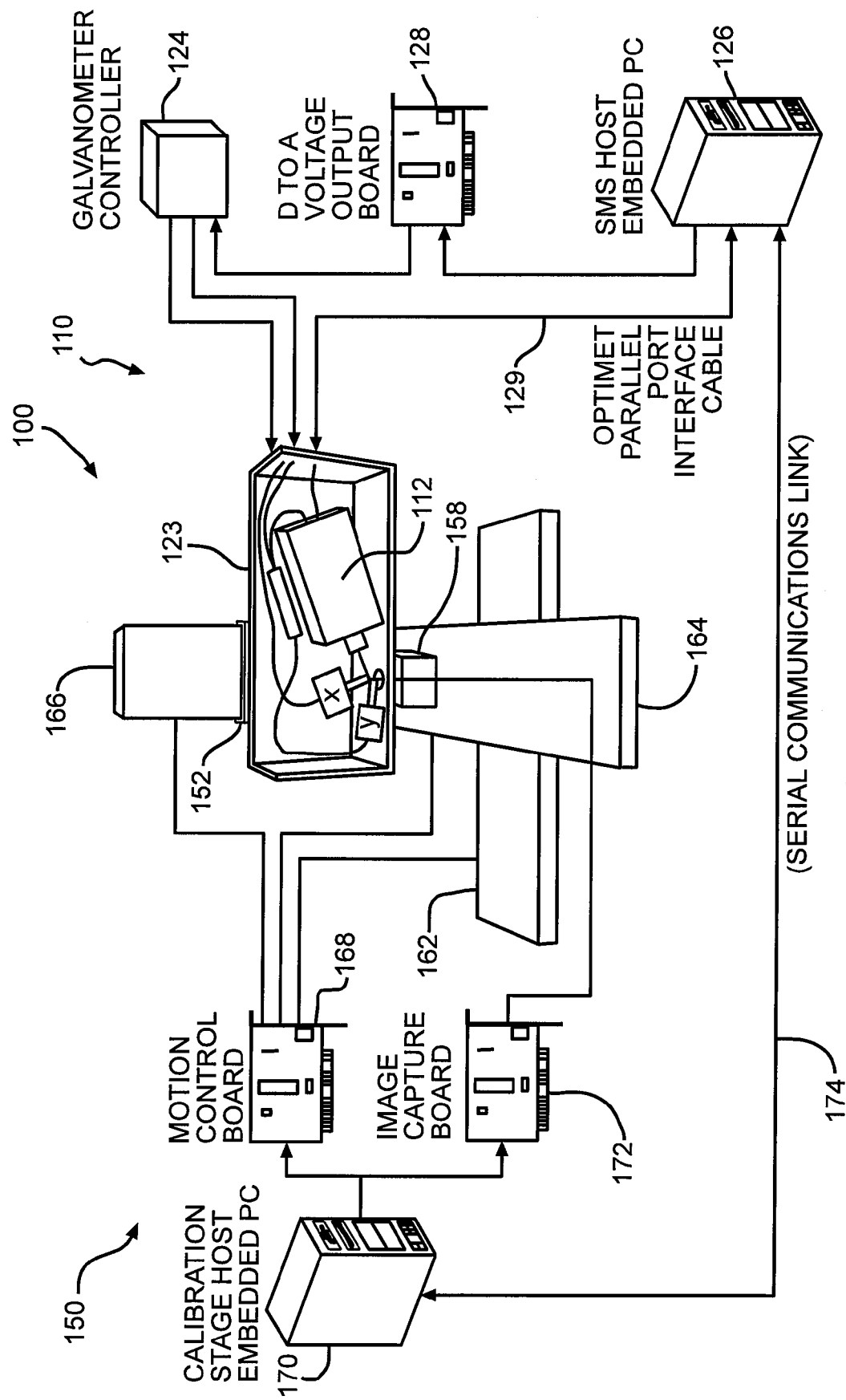
FIG. 1 depicts a flow-chart of one embodiment under the invention of a method of displaying an image of a defect on a part.

FIG. 1 is a schematic view of a measurement system 100 in accordance with one embodiment that includes a data acquisition assembly 110 and a calibration assembly 150. The data acquisition assembly 110 performs measurements on a workpiece, while the calibration assembly 150 enables the proper calibration of the data acquisition assembly 110. Embodiments of systems and methods in accordance with the present invention may be used to perform measurements of a variety of physical characteristics of the workpiece, including, for example, angles, distances, roughness, scratches, hole diameters and other hole characteristics, and a wide variety of other desired measurements.

Figure 2:
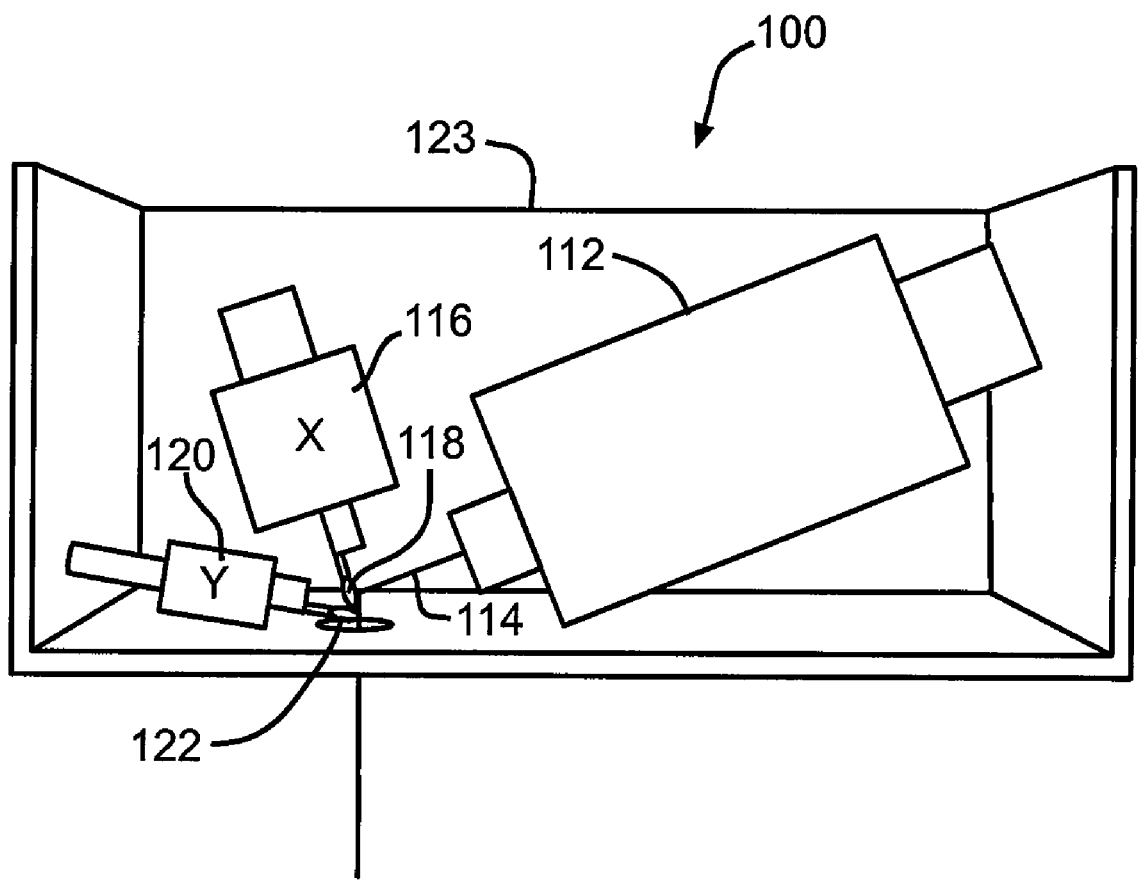
FIG. 2 is an enlarged, side elevational view of a data acquisition assembly of the measurement system of FIG. 1.
Figure 3:
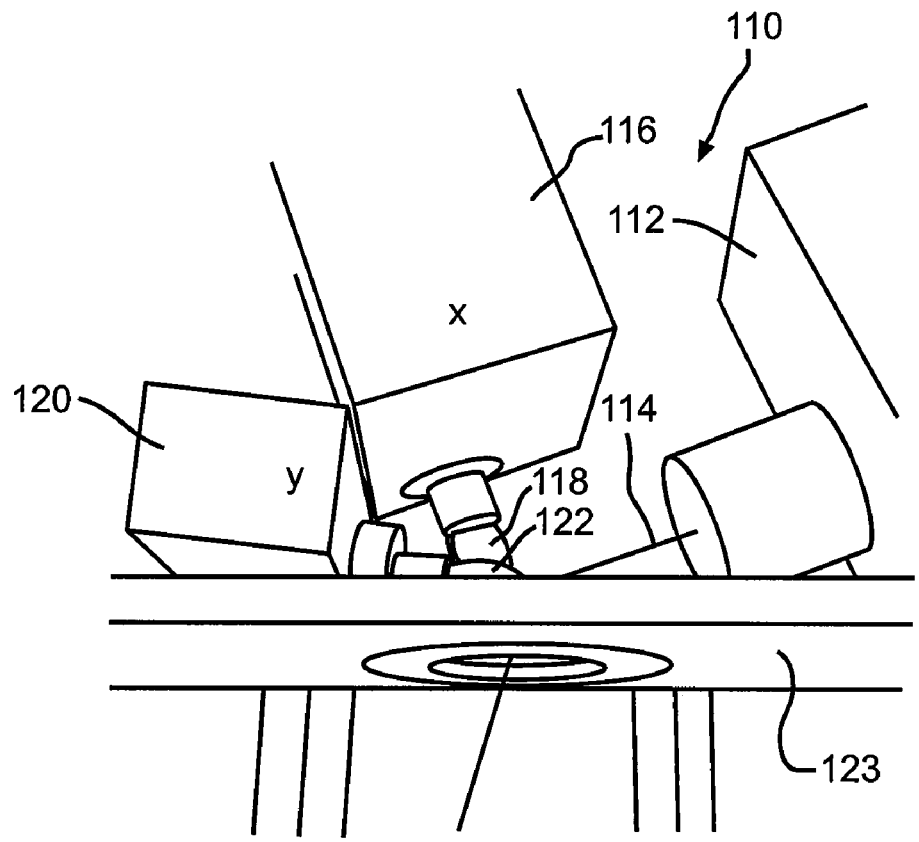
FIG. 3 is an enlarged, lower isometric view of the data acquisition assembly of FIG. 2.

FIGS. 2 and 3 are enlarged, partial elevational and isometric views of the data acquisition assembly 110 of FIG. 1, comprising a scanning conoscopic holography sensor 112 that projects a laser beam 114 onto a workpiece (not shown). A first galvanometer 116 is coupled to a first mirror 118, and a second galvanometer 120 is coupled to a second mirror 122. In some embodiments, the mirrors and galvanometers may be integrated as an assembly, such as those assemblies commercially-available from Cambridge Technology, Inc. of Cambridge, Mass. As best shown in FIG. 1, a galvanometer controller 124 is operatively coupled to the first and second galvanometers 116, 120, and can adjust each galvanometer separately or both simultaneously. A data acquisition computer 126 is coupled to the galvanometer controller 124 via an output board 128, and is also coupled to the sensor 112 by an interface cable 129.

The mirrors 118, 122 typically rotate in different planes. The geometry of these planes is usually application specific and may be important to the success of the overall design of the system. For example, in one particular embodiment, there may be a specific spatial orientation of the mirrors 118, 122 that works best for measurement of holes. Design constraints include minimizing the distance between the two mirrors and maximizing the return light aperture at all required mirror angles. Mirrors may be selected versus linear stages due to their speed, accuracy, weight, and size advantage. Alternately, a four or five axis stage may be required to perform the work of two mirrors. Additionally, the use of mirrors is typically desired for a portable, battery-powered configuration of the invention.

Figure 4:
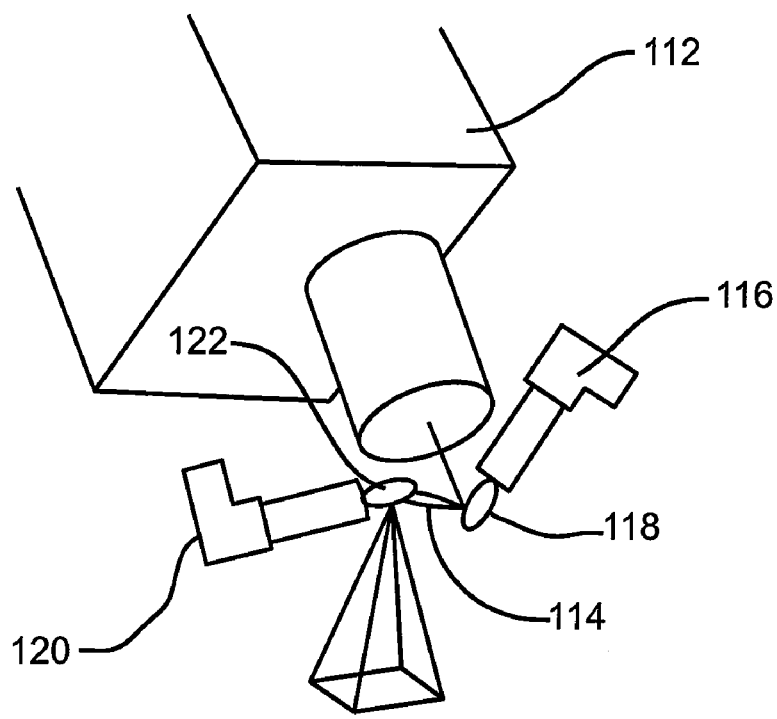
FIG. 4 is an isometric schematic view of the scanning conoscopic holography sensor of FIG. 1 in operation.

In operation, a control signal from the data acquisition computer 126 is transmitted to the sensor 112, causing the sensor 112 to emit the laser beam 114. The laser beam 114 is directed onto the first mirror 118, reflects onto the second mirror 122, and impinges onto the workpiece. FIG. 4 is an isometric schematic view of the sensor 112 in operation with the first and second mirrors 118, 122 and the first and second galvanometers 116, 120. After impinging on the workpiece, at least a portion 135 (FIG. 5) of the laser beam 114 is reflected from the workpiece, and retraces its original path back to the scanning conoscopic holography sensor 112. One or more additional control signals are transmitted from the data acquisition computer 126 to the galvanometer controller 124. The galvanometer controller 124 receives the additional control signals and controllably positions the first and second galvanometers 116, 120 which, in turn, controllably adjusts the positions of the first and second mirrors 118, 122, respectively. By controllably adjusting the positions of the first and second mirrors 118, 122, the sensor 112 acquires the reflected portion 135 (FIG. 5) of the laser beam and transmits corresponding signals to the data acquisition computer 126 to perform the desired measurements on the workpiece, as described more fully below. The corresponding signals transmitted to the data acquisition computer 126 may be a post-processed signal, or alternately, may be the actual reflected portion 135 of the laser beam.

Figure 5A:
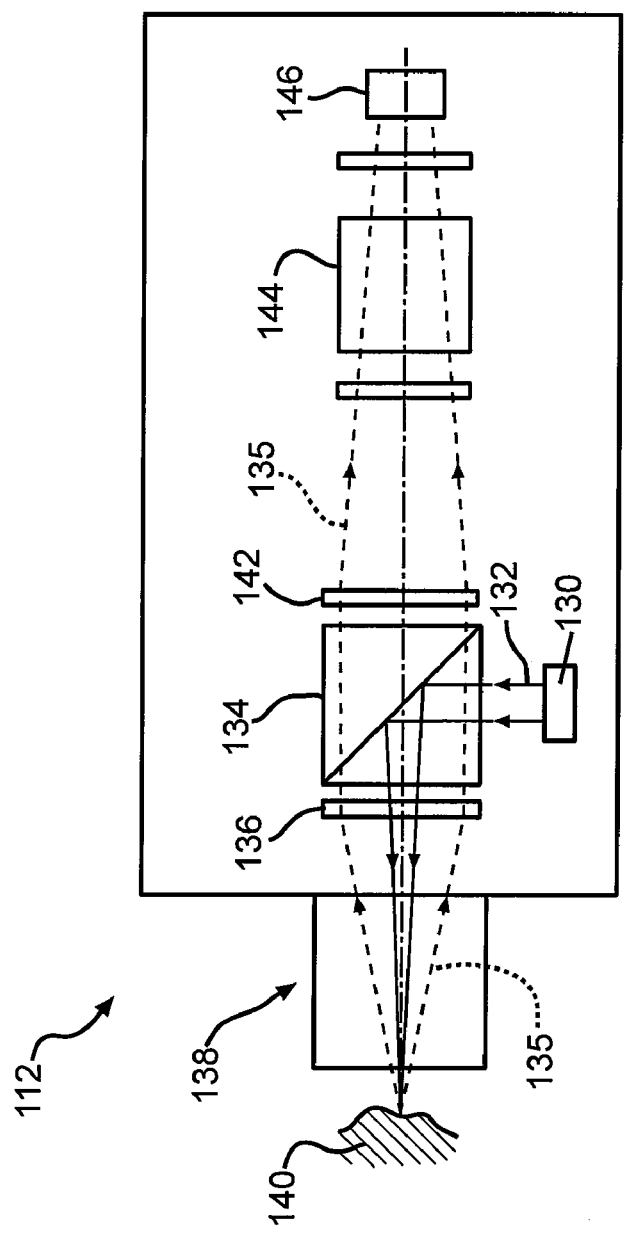
FIG. 5 is an enlarged, side cross-sectional schematic view of a conoscopic holography sensor of the data acquisition assembly of FIG. 2.
Figure 5B:
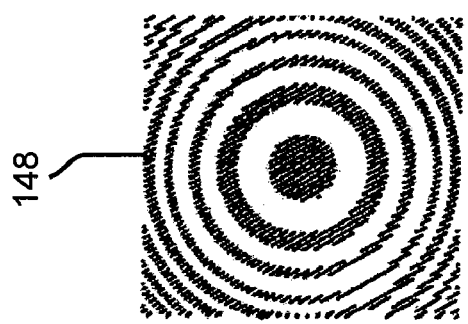

FIG. 5 shows the sensor 112 where a laser diode 130 that emits an initial laser beam 132 onto a beam splitter 134. At least a portion of the initial laser beam 132 is reflected through an adaptation objective 136 and through a lens assembly 138 toward the first and second mirrors 118, 122, and ultimately, onto the workpiece 140. Scattered light reflected from the workpiece 140 is received through the lens assembly 138 and the beam splitter 136, and passes through a sharpening objective 142 and a conoscopic module 144 that includes a birefringent crystal before impinging on a CCD camera 146. In one particular embodiment, the scanning conoscopic holography sensor 112 shown in FIG. 5 is an Optimet Conoprobe Sensor commercially-available from Optimet Metrology Ltd. of Jerusalem, Israel. In alternate embodiments, of course, any other suitable type of scanning conoscopic holography sensor may be used.

The birefringent crystal of the conoscopic module 144 modifies the speed of each light ray of the reflected portion 135 of the laser beam differently in accordance with its angle. This creates a high contrast fringe pattern 148 on the CCD camera 146. The angle of the light ray is a function of the distance between a reference plane and the laser spot projected on the workpiece 140. In the presently preferred embodiment, the sensor 112 performs the analysis and determination of the distances (or measurements) of interest, however, in alternate embodiments, these analyses may be performed by other suitable components of the system 100, including, for example, the data acquisition computer 126. This analysis may be performed as the sensor 112 scans the surface of the workpiece under measurement, or may be performed in a post-processing manner.

More specifically, in one particular embodiment, the data acquisition assembly 110 is adapted to measure the linear distance to at least one point on a surface of the workpiece 140, and report back that distance via the data acquisition computer 126. The scanning conoscopic holography sensor 112 may, in one embodiment, acquire 10,000 distance measurements per second. As noted above, the output laser beam 114 from the sensor 112 is directed at the first mirror 118 which is mounted on the first galvanometer 116. The laser beam 114 reflects off the first mirror 118 and then strikes the second mirror 122. The second mirror 122 is also under positional control via the second galvanometer 120. In one particular embodiment, both the first and second galvanometers 116, 118 can be controlled to rotate to any position within an approximately 40.degree. range, respectively. The net result is that the laser beam 114 exits in a controlled vector direction over a desired range of angles in the X, Y, and Z directions.

In one particular embodiment, the galvanometer controller 124 responds to the DC input voltage in the range from −10 VDC to +10 VDC and proportionately rotates the output shafts of the first and second galvanometers 116, 120 (and the first and second mirrors 118, 122) to the desired angle. The output board 128 may be a 16-bit digital-to-analog DC voltage output board (D to A board) that generates the desired DC input voltage to the galvanometer controller 124.

Application software running on the data acquisition computer 126 programmatically controls the input voltages to the first and second galvanometers 116, 120. The application software can generate any scanning pattern such as a circular path (for measurement of hole diameter) or a raster scan (for measurement of surface defects). The application software may communicate with the sensor 112 through a parallel port of the data acquisition computer 126 via the interface cable 129. The application software regulates the amount of power to the sensor 112 depending on the surface reflectivity and angle of incidence. The application software triggers the acquisition of the measurements of the sensor 112 and correlates those measurements with the X and Y positions of the first and second mirrors 118, 122. The application software computes the three dimensional position of each measurement point on the workpiece 140. A "cloud" of measurement points is further reduced to the desired dimensional measurement, such as the diameter of a hole or the depth of surface scratch.

Embodiments of the data acquisition systems in accordance with the present invention provides significant advantages over the prior art. For example, the data acquisition assembly 110 is capable of performing accurate measurements on highly reflective surfaces, including aluminum. The data acquisition assembly 110 can also measure at very high angles of incidence (e.g. for measurement of deep holes). The data acquisition assembly 110 may have a larger range-to-precision ratio than prior art devices, and the precision, range, and spot size may be adjusted by changing objective lenses within the lens assembly 138, allowing for greater versatility from the same device. Data acquisition systems in accordance with the present invention may also be less affected by dirt or debris in the return path of the measurement beam 114. Furthermore, since the transmitted and received paths of the laser beam 114 or coaxial, the beam can be steered with planar mirrors. Embodiments of data acquisition systems in accordance with the present invention may also reduce assumptive errors in the measurement process, and 80 greatly reduce the number of specialized measurement gauges required to perform manufacturing and assembly processes of large, relatively complex structures, including commercial aircraft and the like.

Embodiments of the present invention are expected to provide measurement accuracies of hole diameter to within 0.0002 inches. In optical systems, a single point accuracy may be worse than a surface-averaged accuracy, and thus, many more points than just the two located at the ends of a particular diameter are desired. Other considerations, such as hole data alignment and reference surface measurement, further increase the desirability of measuring a greater number of points to achieve a desired measurement. Thus, the assumptive errors of traditional measurements, which tend to measure at a single contact point, are reduced by the present invention since it is capable of measuring surfaces and involves an analysis that is typically more thorough than the prior art.

Figure 6:
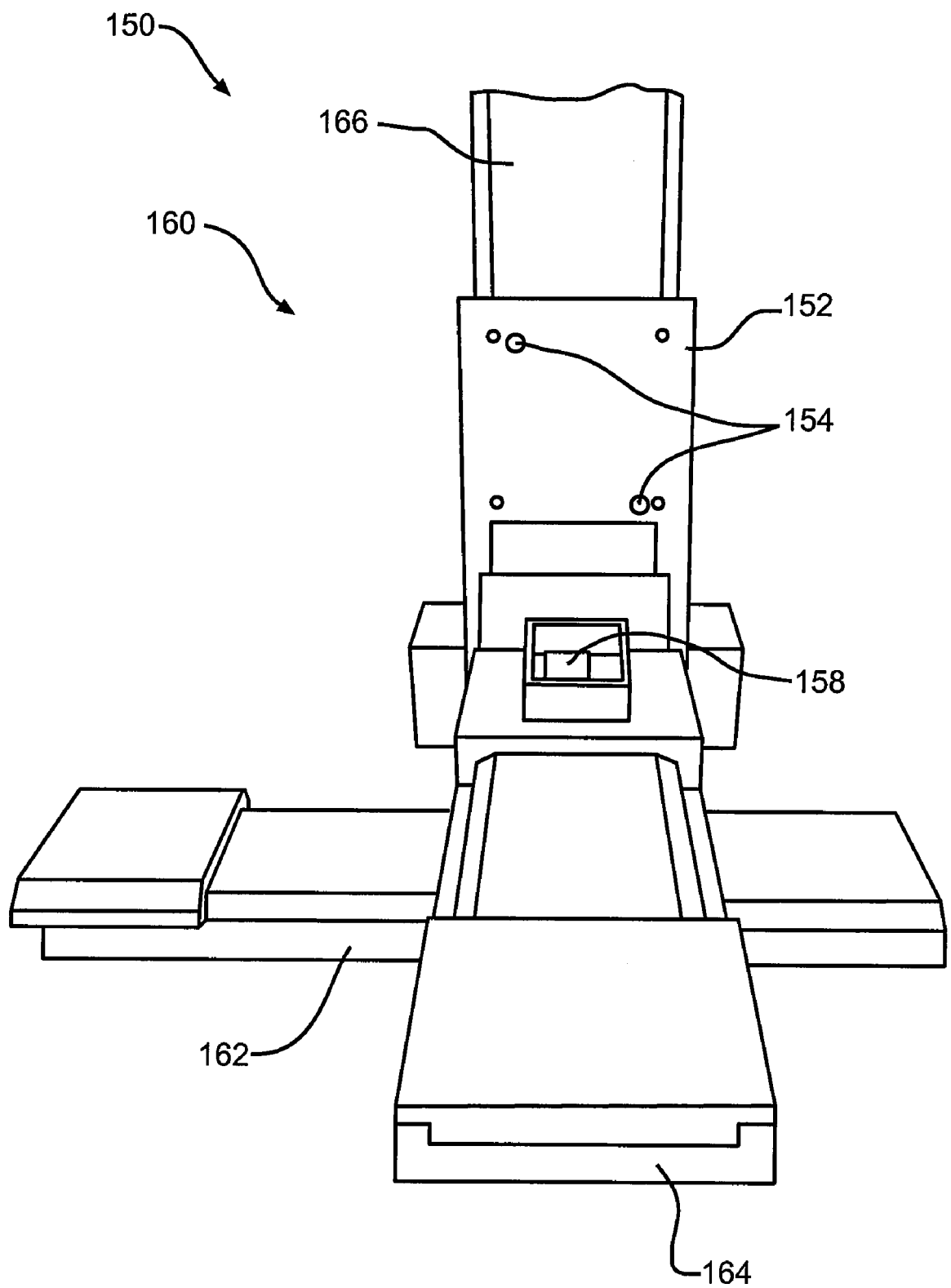
FIG. 6 is an upper isometric view of a calibration assembly of the measurement system of FIG. 1.

FIG. 6 is an upper isometric view of the calibration assembly 150 of the measurement system 100 of FIG. 1. In this embodiment, the calibration assembly 150 includes a carriage 152 mounted on a three axis stage 160. Index pins 154 are provided on the carriage 152 for mounting at least a portion of the data acquisition assembly 110 to the three axis stage 160. For example, in the embodiment shown in FIGS. 2 and 3, the scanning conoscopic holography sensor 112, the first and second galvanometers 116, 120 and the first and second mirrors 118, 122 are attached to a sensor platform 123 that is, in turn, coupled to the carriage 152 via the index pins 154. As further shown in FIG. 6, the three axis stage 160 includes a first (or X) axis rail 162, a second (or Y) axis rail 164, and a third (or Z) axis rail 166. A camera 158 (e.g. a CCD camera) is coupled to the three axis stage 160 approximate the carriage 152, and is adapted to receive the laser beam 114 emitted from the sensor 112.

Referring again to FIG. 1, the calibration assembly 150 further includes a calibration computer 170 operatively coupled to the first, second, and third axis rails 162, 164, 166 via a motion control board 168 (FIG. 1). The calibration computer 170 is also coupled to the camera 158 through an image capture board 172, and to the data acquisition computer 126 by a communications link 174.

Figure 7:
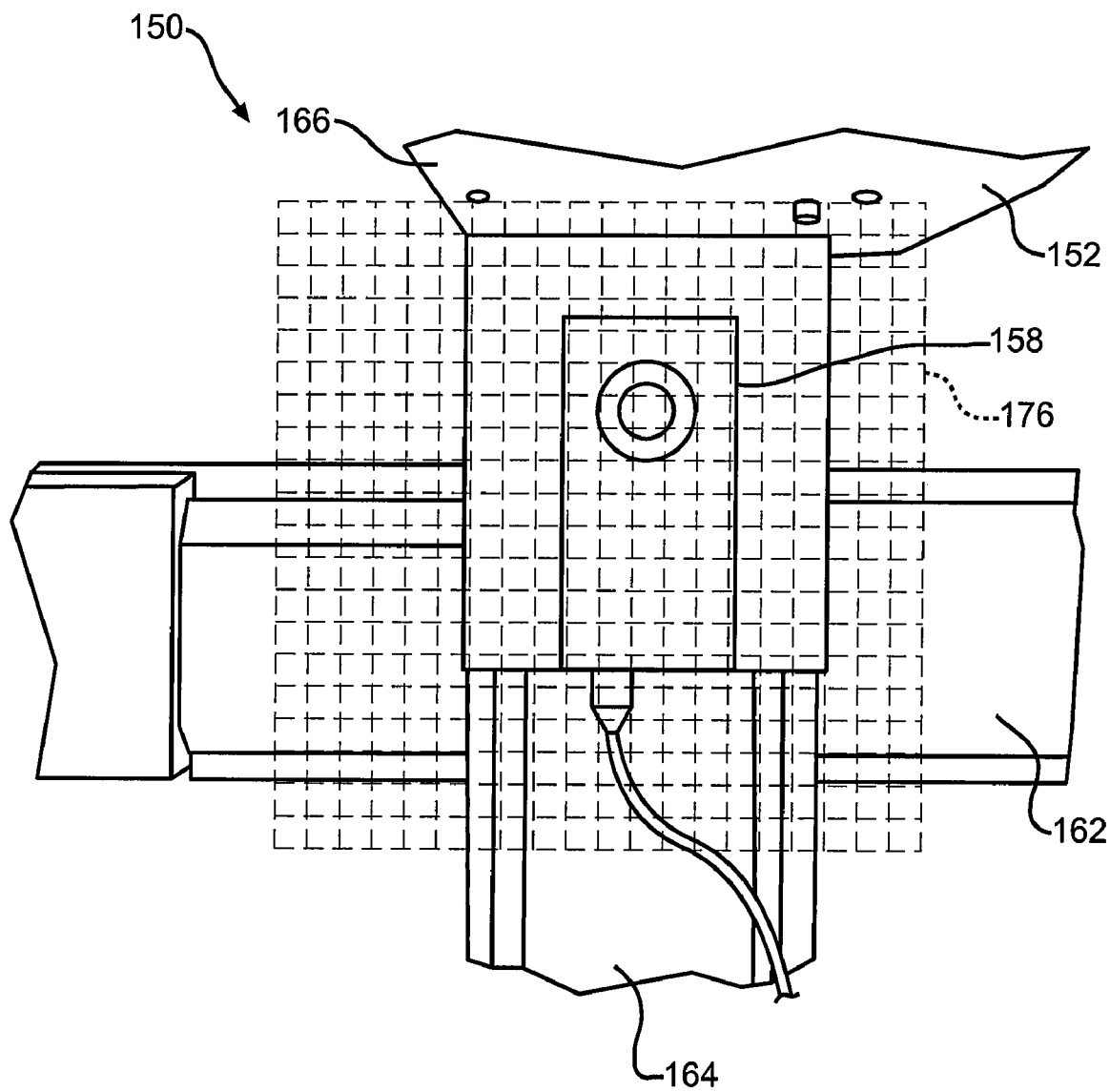
FIG. 7 is a top elevational view of a grid overlaid on the calibration assembly of FIG. 6.

In operation, the three axis stage 160 and the camera 158 of the calibration assembly 150 are integrated to form a detection area 176 sufficiently large enough to measure and calibrate the measurement range of the data acquisition assembly 110. FIG. 7 is a top elevational view of the detection area (or grid) 176 overlaid on a portion of the calibration assembly 150 of FIG. 5. Control signals from the calibration computer 170 (FIG. 1) are transmitted through the motion control board 168 to controllably position the first, second, and third axis rails 162, 164, 166, and thus, the positions of the carriage 152 and the camera 158. Similarly, the data acquisition computer 126 drives the mirrors 118, 122 and the sensor 112 using test voltages, and the camera 158 reports a spot centroid position of the laser beam 114. The spot centroid position is reported back to the data acquisition computer 126 through the image capture board 172 of the calibration computer 170. The camera 158 is movable throughout the detection area 176 using the three axis stage 160 (i.e. in this embodiment, using the first and second axis rails 162, 164) to enable calibration of the data acquisition assembly 110 over a larger effective area. The detection area (or grid) 1176 illustrates the original digital camera chip sensitive area and that area expanded by use of the stage 160 to produce a much larger effective sensitive area.

After each test input voltage has been commanded from the data acquisition computer 126, the calibration assembly 150 acquires the spot centroid location of the laser beam 114 using the camera 158 and saves the location. This process may be repeated over the entire voltage range of the first and second (or X and Y) galvanometers 116, 120, and for several reference heights along for third (or Z) axis rail 166. The calibration computer 170 may than collect the test data consisting of spot centroid position as a function of galvanometer control voltages, and may return the vector-based equations that defined the required galvanometer control voltages to measure and desired position in a three-dimensional space. These calibration data are then returned and stored in the data acquisition computer 126 of the data acquisition assembly 110.

In one embodiment, a data fitting process for characterizing the test data may include two main components. In a first main component, given a set of unorganized (e.g. non-gridded) input data (x,y,z) in 3-dimensional space, and a corresponding set of data (u,v) in 2-dimensional space, a function f(x,y,z)=(u,v) may be constructed that will give (u,v) for any (x,y,z). In a presently preferred embodiment, the (u,v) are the x axis and y axis galvanometers control voltages, and the (x,y,z) are the spot centroid positions mentioned above. One way to proceed involves using a data fitting method from 3-dimensional space to 2-dimensional space.

Alternately, methods for fitting data from 2-dimensional space to 3-dimensional space may be used, and then an inverse may be calculated. More specifically, a conventional software routine may be applied to the 2-dimensional data to construct a function g(u,v)=(x,y,z). Typically, such routines may employ tensor-product spline functions and may involve choosing "knots" which may, for example, be placed uniformly at the data points. Next, the inverse of, z g may be constructed by using a closest-point operation. That is, given a point (x,y,z), the corresponding (u,v) may be calculated by projecting (x,y,z) onto g, and then the inverse of g gives the desired function.

In a further embodiment of the invention, additional calibration testing may be performed to measure the laser beam path distance to a flat reference surface as the first and second mirrors 118, 122 are rotated. More specifically, as the mirrors 118, 122 rotate, there is a change in the distance that it takes the laser beam 114 to pass through the mirrors 118, 122. It may be desirable to measure and compensate for this change in distance to avoid or reduce systematic measurement errors.

In yet another embodiment of the invention, additional calibration testing may be performed to determine the optical parallax of a filter of the camera 158 that may cause an error between measured and actual spot centroid position of the laser beam 114. In the corresponding data reduction process, the input data are in 3-dimensional space (i.e. x axis galvanometer control voltage, y axis galvanometer control voltage, and laser beam path distance), and corresponding data are in 1-dimensional space (i.e. the vertical distance from the SIMS to the reference surface). Accordingly, a similar approach may be used involving constructing a function from a 1-dimensional space to a 3-dimensional space, and taking its inverse using conventional software algorithms.

Alternate embodiments of measurement systems in accordance with the present invention may be conceived, and the invention is not limited to the particular embodiments described or shown in FIGS. 1-7. For example, the functions performed by the calibration computer 170 and the data acquisition computer 126 may be integrated into a single computer, eliminating the need for two computers. In another embodiment, the three axis stage 160, and the associated control components of the motion control board 168 and the calibration computer 170, may be incorporated into the data acquisition assembly 110 and may be used to controllably position the sensor 112 over the workpiece 140 for performing measurements thereon, essentially eliminating the camera 158 and the image capture board 172 from the system 100 shown in FIG. 1. Furthermore, for more limited measurement applications, the three axis stage 160 may be replaced by a two axis or even a single axis position control system.

Figure 8:
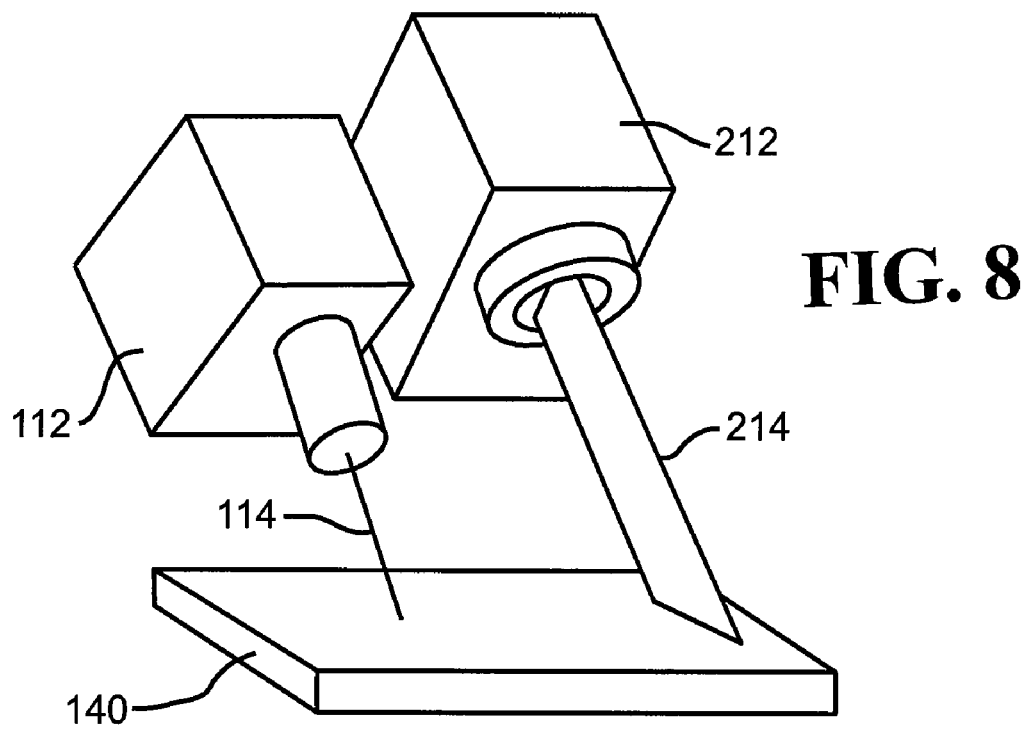
FIG. 8 is an isometric view of a pair of conoscopic holography sensors that may be employed in measurement system in accordance with alternate embodiments of the invention.

In other alternate embodiments, the particular conoscopic holography sensor 112 described above may be replaced with a sensor capable of measuring a plurality of points rather than a single point measurement. FIG. 8 is an isometric view of the conoscopic holography sensor 112 of FIGS. 1-5, as well as a conoscopic holography line sensor 212 that may be used in a measurement system in accordance with an alternate embodiment of the invention. In this embodiment, a sheet of laser light 214 is directed onto the workpiece 140, enabling the measurement of distances from the sensor 214 to the workpiece 140 along an entire line. In one particular embodiment, the conoscopic holography line sensor 212 is a model commercially-available from Optimet Metrology Ltd. and is capable of recording distance measurements at a rate of 18,000 points per second.

Embodiments of systems and methods in accordance with the present invention may be used to perform a wide variety of different measurements. For example, measurement systems in accordance with the present invention may be used to measure angles and distances, micro-surface profiles for roughness and scratches, hole diameters and hole bores, runout, cylindricity, coaxiality of mating parts, hole angularity of various diameters, surface-to-surface mismatch of two adjacent components, depth and flushness of countersunk holes, countersink depth, protrusions of bolts and nuts after installation, ovality and taper of holes, height of tubing bead, bead height of sealant fillets, radii of machined surfaces, radius undercuts, and a wide variety of other desired measurements. Thus, the number of specialized, single-purpose gauges needed during the manufacture and assembly of large, relatively-complex structures, and the costs associated therewith, may be reduced. Furthermore, the accuracy of manufacturing and assembly processes may be improved in comparison with the prior art, reducing labor and expenses associated with part rejections, reworking, and waste.

Figure 9:
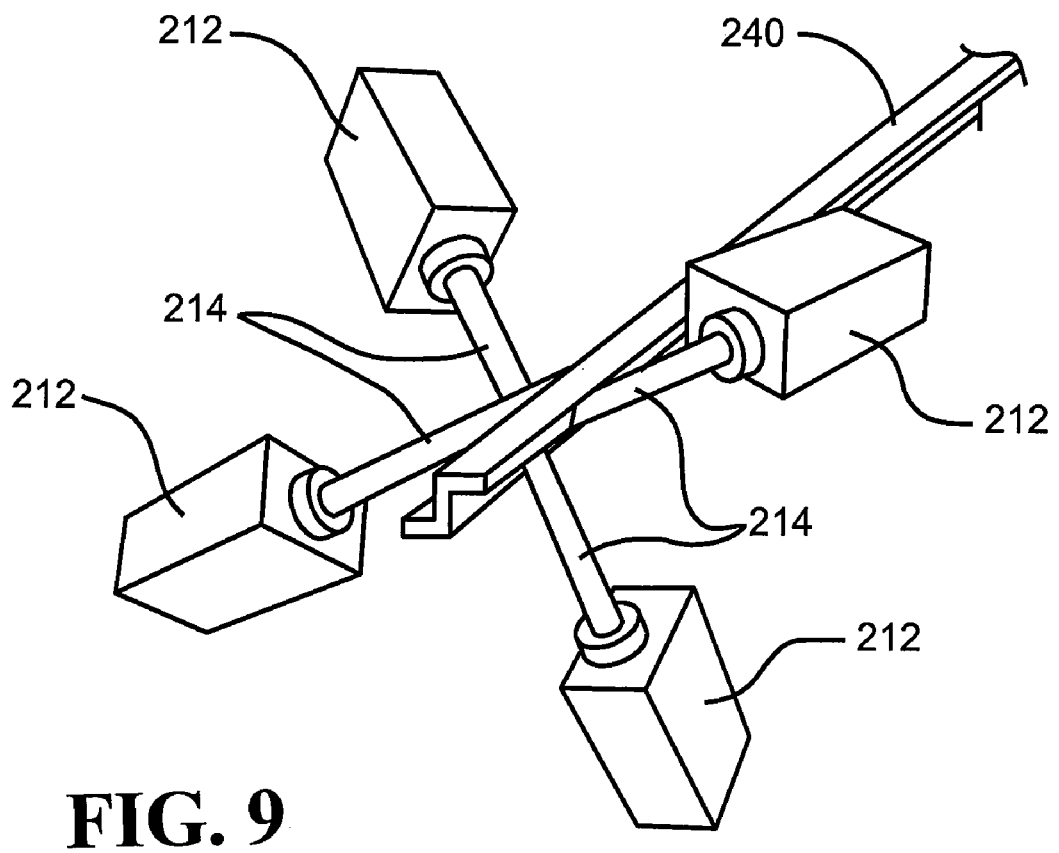
FIG. 9 is an isometric view of four conoscopic holography line sensors arranged for analyzing a workpiece in accordance with another embodiment of the invention.

In another particular embodiment, a measurement system in accordance with the present invention may be used to provide a complete three dimensional mapping of a workpiece. For example, FIG. 9 is an isometric view of a plurality of conoscopic holography line sensors 212 performing an analysis of a workpiece 240 in accordance with another embodiment of the invention. A plurality of line sensors 212 are distributed around the workpiece 240, with a sheet of laser light 214 from each line sensor 212 directed onto a portion of the workpiece 240. In some embodiments, the specific orientation of the line sensors 212 may be dependent upon the characteristics (e.g. cross-sectional shape) of the workpiece 240. By moving the workpiece 240 relative to the line sensors 212 (e.g. by mounting the line sensors 212 on a rolling frame), a three-dimensional surface scan of the workpiece 240 may be performed.

Figure 10:
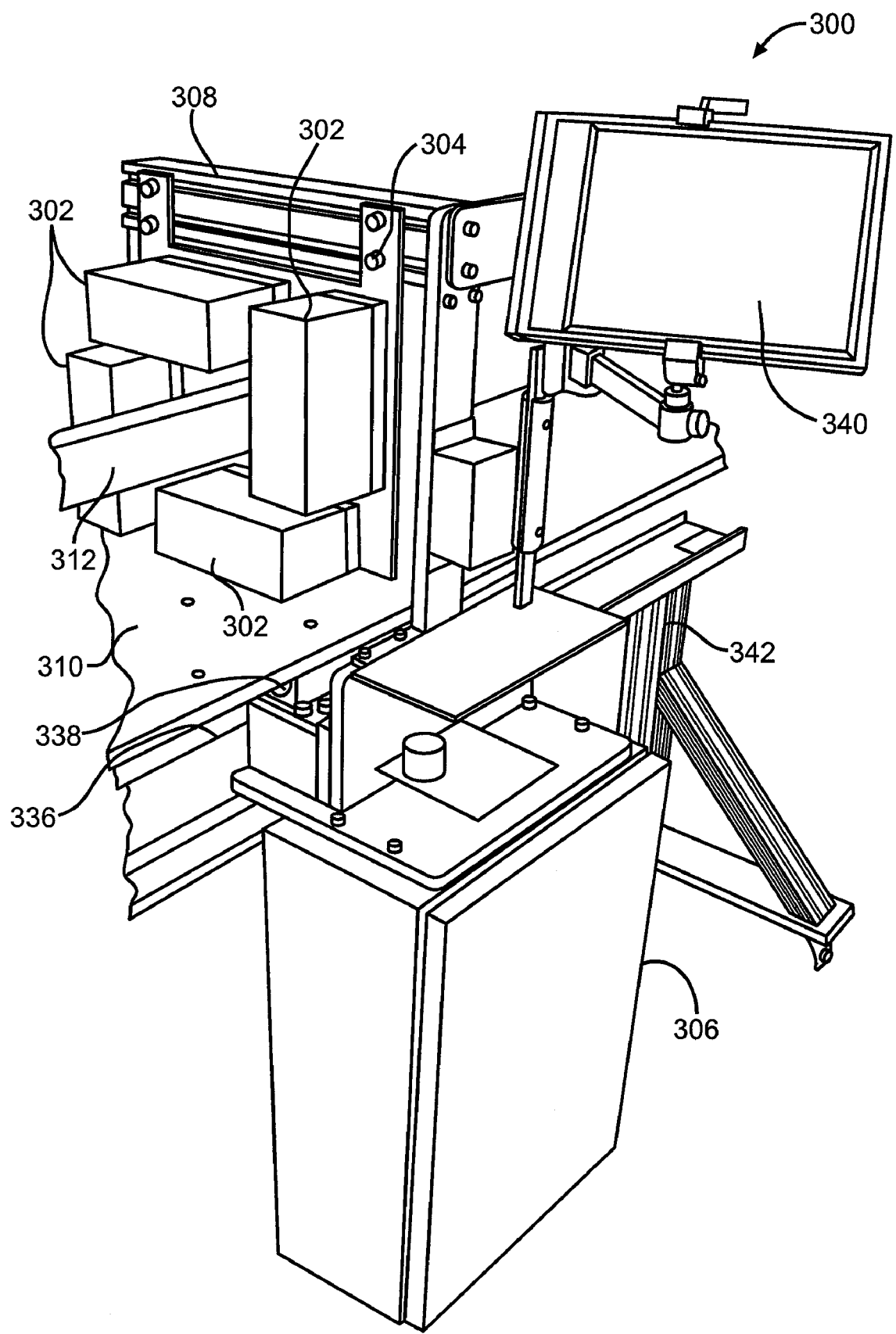
FIG. 10 depicts a perspective view of another embodiment of a measurement system under the invention.

FIG. 10 depicts another embodiment of a measurement system 300 under the invention. The system 300 may include four measurement modules 302 bolted to an array frame 304, an electronic control module 306, a measurement carriage frame 308 to which the array frame 304 is attached, and a measurement table 310. The four measurement modules 302 may be distributed around a periphery of a workpiece 312 to be measured in order to measure the entire circumference of the workpiece 312. In one embodiment, the four measurement modules 302 may substantially form a square shape, but in other embodiments, the for measurement modules 302 may substantially form a rectangular shape, a circular shape, or other shape to cover a circumference of the workpiece 312. The workpiece 312 to be measured may comprise a part of an aircraft such as a stringer or other part of an aircraft having a variety of shapes, configurations, and sizes. In other embodiments, the workpiece may comprise a non-aircraft part. In still other embodiments, any number of measurement modules 302 may be distributed around and/or along various portions of the workpiece 312. In additional embodiments, the measurement modules 302 may be disposed relative to the workpiece 312 using differing components and configurations which may or may not utilize an array frame 304, a measurement carriage frame 308, and/or a measurement table 310.

Figure 11:
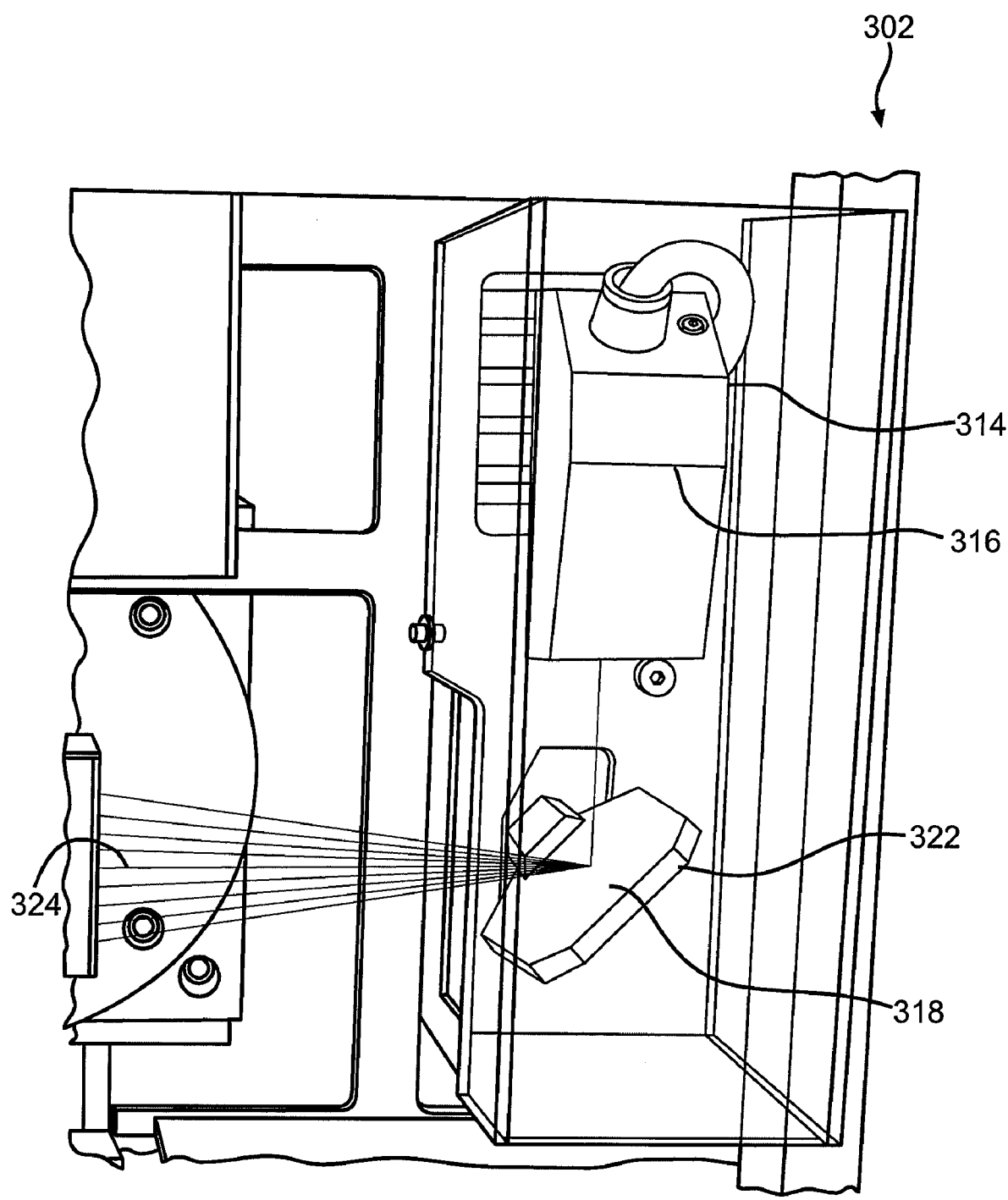
FIG. 11 depicts a partial front view of a measurement module of FIG. 10.

As shown in FIG. 11, each measurement module 302 may comprise a temperature sensor 314, an optical displacement sensor 316, and a galvanometer and mirror assembly 318. The optical displacement sensor 316 may be a triangulating laser displacement sensor, and may be adapted to measure the distance to a point on a surface of the workpiece 312. In other embodiments, varying types of sensors may be utilized. The galvanometer and mirror assembly 318 may include a galvanometer (not shown) which rotates a mirror 322. The displacement sensor 316 may emit a light beam 324 which reflects off the mirror 322 and towards the workpiece 312. Due to the rotation of the mirror 322 by the galvanometer (not shown), the light beam 324 may be directed so that it sweeps across a surface of the workpiece 312. The temperature sensor 314 may monitor the case temperature of the optical displacement sensor 316, and may compensate for temperature dependent displacement error. In other embodiments, varying numbers, types, locations, and configurations of measurement modules 302 may be utilized having differing components.

Figure 12:
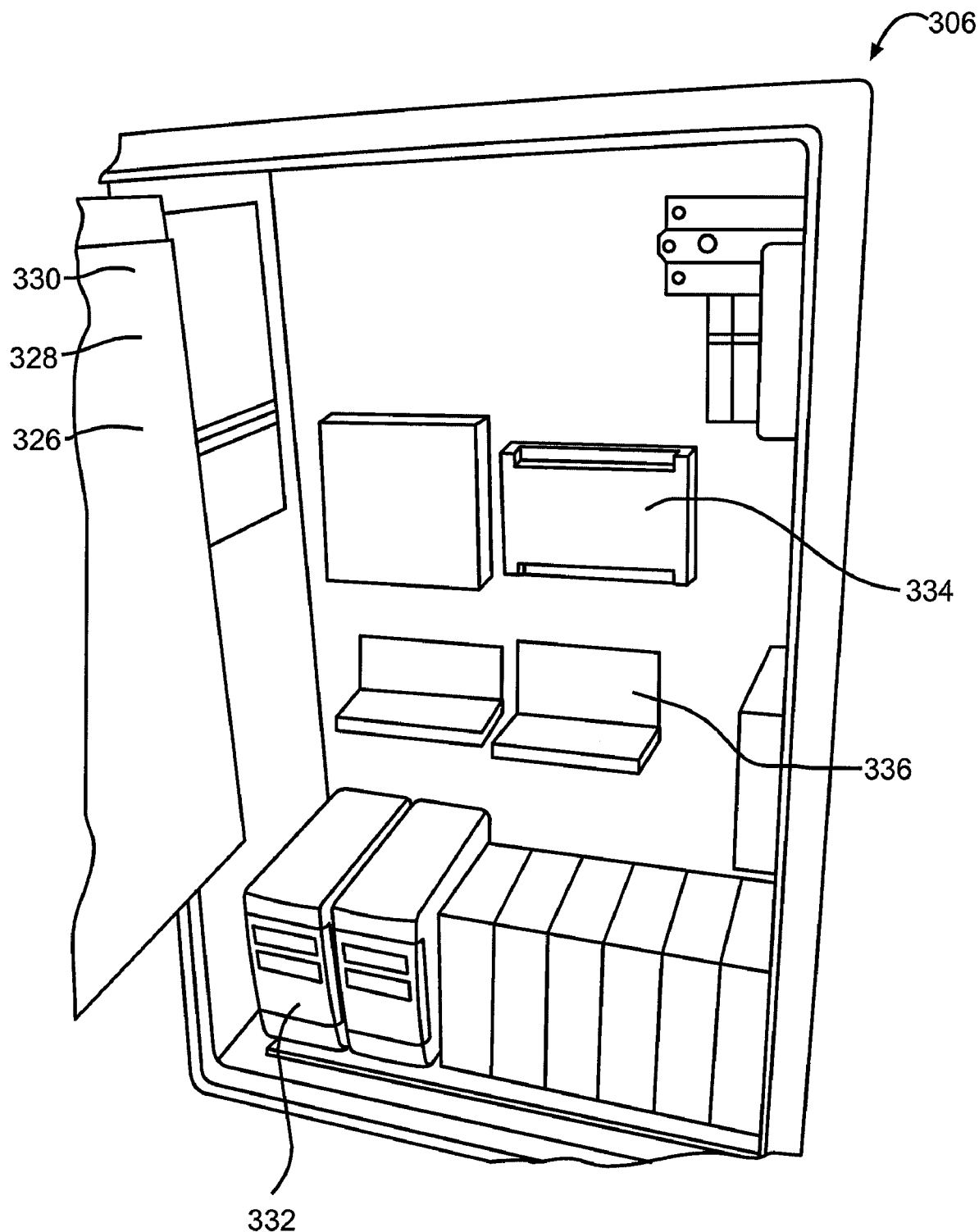
FIG. 12 depicts a partial front view of a electronic control module of FIG. 10.

As shown in FIG. 12, the electronic control module 306 may comprise a computer 326 having a digital to analog voltage card 328 and an analog voltage to digital card 330, an optical displacement sensor controller 332, a temperature sensor controller 334, and a galvanometer controller card 336. The controlling software running on the computer 326 may generate control voltages that are sent to the galvanometer controller card 336, which may orient the galvanometers (not shown) and mirrors 322 proportionately to the input control voltages. The digital to analog voltage card 328 may generate mirror control voltages. The analog voltage to digital card 330 may provide high speed acquisition of the displacement sensor controller 332 voltage output signals. The temperature sensor controller 334 may monitor the case temperature of each of the optical displacement sensors 316. In other embodiments, varying numbers, types, locations, and configurations of electronic control modules 306 may be utilized having differing components.

As shown in FIG. 10, the four measurement modules 302, the array frame 304 to which they are bolted, and the electronic control module 306 may each be attached to the measurement carriage frame 308. The measurement carriage frame 308 may be adapted to move along a linear slide 336 which is attached to the measurement table 310. The linear position of the carriage frame 308 may be measured using a linear encoder 338 which may report the position of the carriage frame 308 as it moves along the table 310. A computer 340 may be attached to the carriage frame 308, and may function as a user interface to the computer 326 of the electronic control module 306. Support columns 342 may be attached to the table 310 to raise the table 310 off the ground. Part clamp tooling (not shown) may hold the workpiece 312 in a fixed position with respect to the table 310, and to the measurement modules 302. In other embodiments, varying mechanisms may be utilized to move the measurement modules 302 with respect to the workpiece 312.

Figure 13:
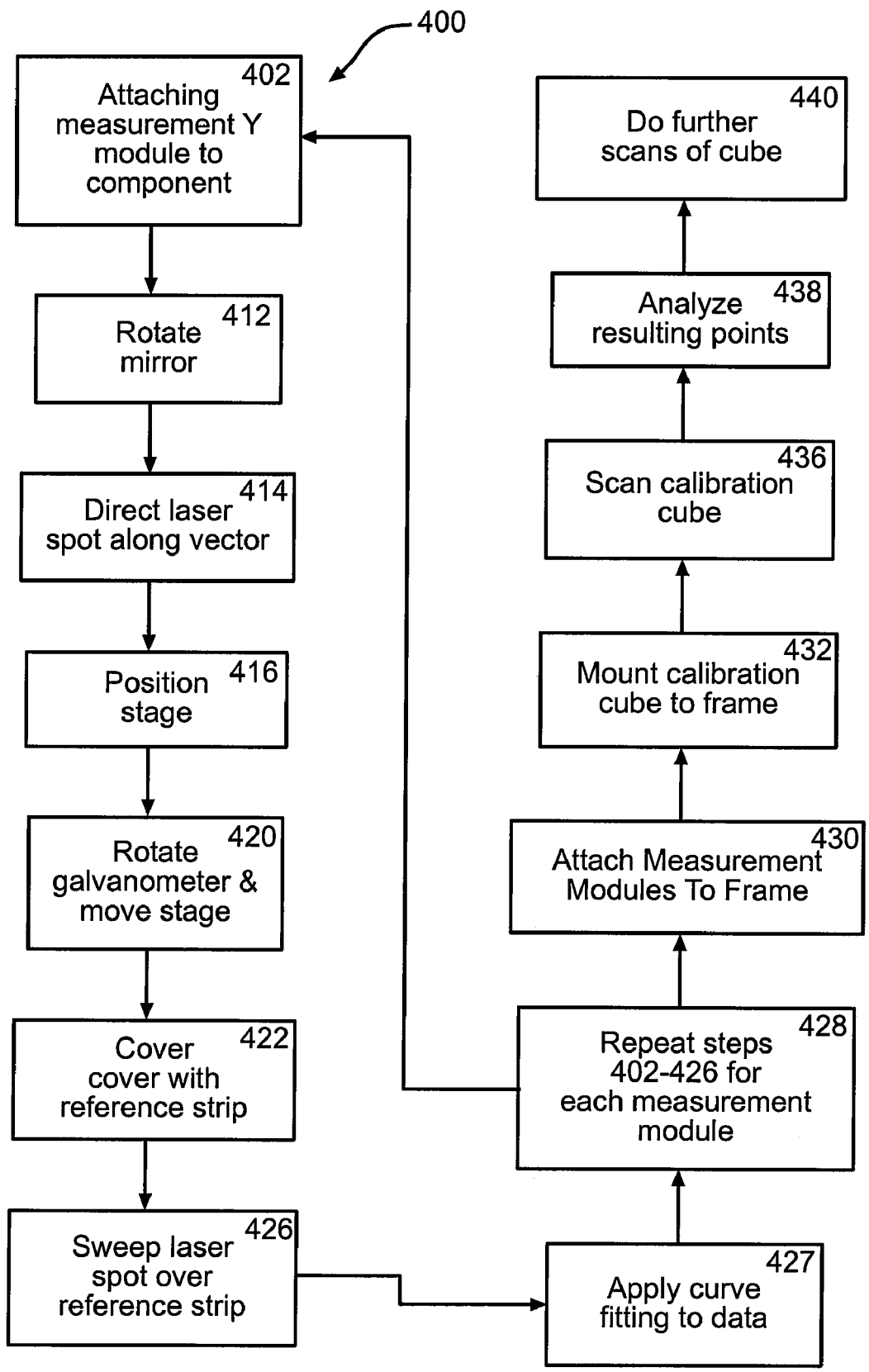
FIG. 13 depicts a flowchart of another embodiment under the invention for calibrating a measurement system.
Figure 14:
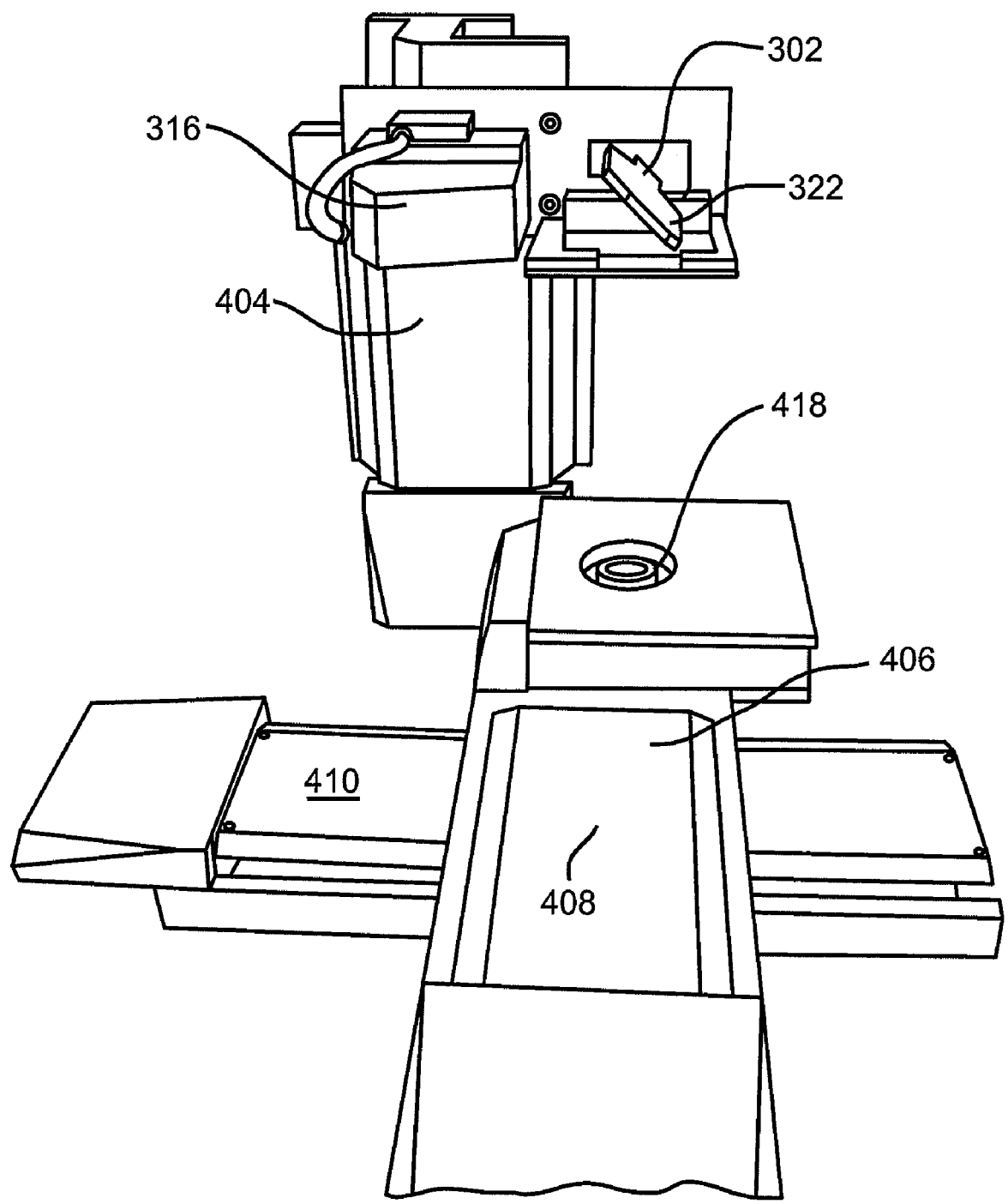
FIG. 14 depicts an elevational view showing the attachment of a measurement module to a calibration stage under one embodiment of the invention.

FIG. 13 depicts a flowchart 400 of another embodiment under the invention of a method of calibrating a measurement system. In one embodiment, the method may be utilized to calibrate the measurement system 300 of FIG. 10 so that the system may produce measurements in inch space coordinates. In one step 402 of the method, as depicted in FIGS. 13 and 14, one of the four measurement modules 302 of the four measurement module system 300 may be attached to a moveable Z axis component 404 of a three axis linear stage 406 comprising a moveable X component 408, a moveable Y component 410, and a moveable Z component 404. The single measurement module 302 may comprise an optical displacement sensor 316, a galvanometer (not shown), and a mirror 322. In other embodiments, the single measurement module 302 may include other components such as those disclosed in other embodiments.

In step 412, the galvanometer may rotate to a start position which rotates the mirror 322 accordingly. In step 414, the laser spot emanating from the optical displacement sensor 316 may be directed by the mirror 322 along a start vector. In step 416, the stage's X axis component 408 may be positioned so that the laser spot emanating from the optical displacement sensor 316 targets a digital camera chip 418 attached to the stage's X axis component 408. The digital camera chip 418 may be adapted to detect (sense) the centroid of the laser spot cast within its area range of measurement. In step 420, in a series of step increments, the galvanometer may be rotated and the stage 406 may be moved in X and Z directions by moving the X and Z components 408 and 404 of the stage 406. During this movement, the digital camera chip 418 may be moved as the X and Z components 408 and 404 of the stage 406 move. The spot position versus input voltage measurements may be repeated at several z heights of the Z component 404. The resulting data set may calibrate the spot position in X-Z inch space to the input voltage of the galvanometer controller. In such manner, the position of the laser spot may be correlated to the input voltage of the galvanometer controller.

Figure 15:
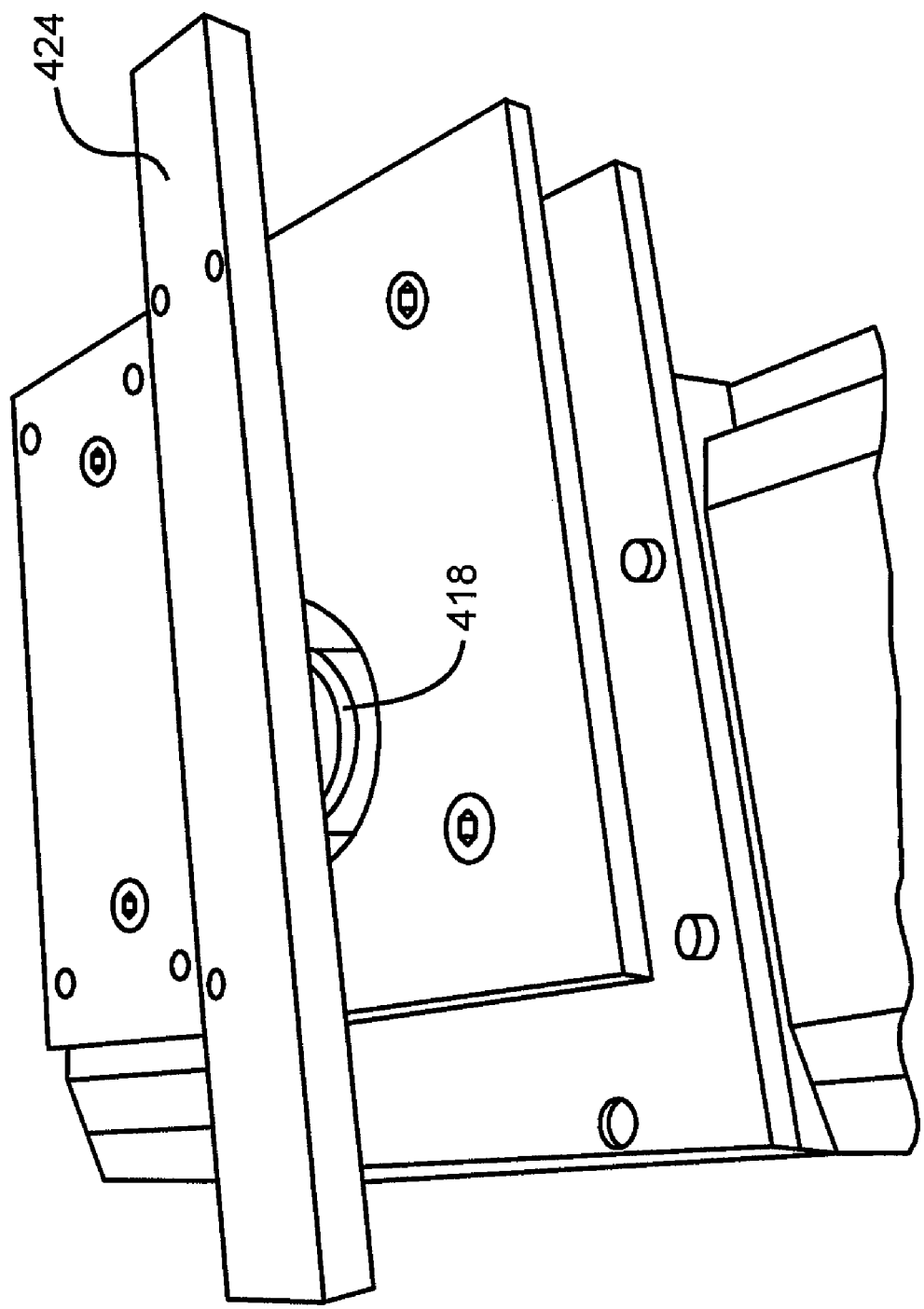
FIG. 15 depicts an elevational view showing a reference strip covering a camera during calibration of a measurement module under one embodiment of the invention.
Figures 16, 17:
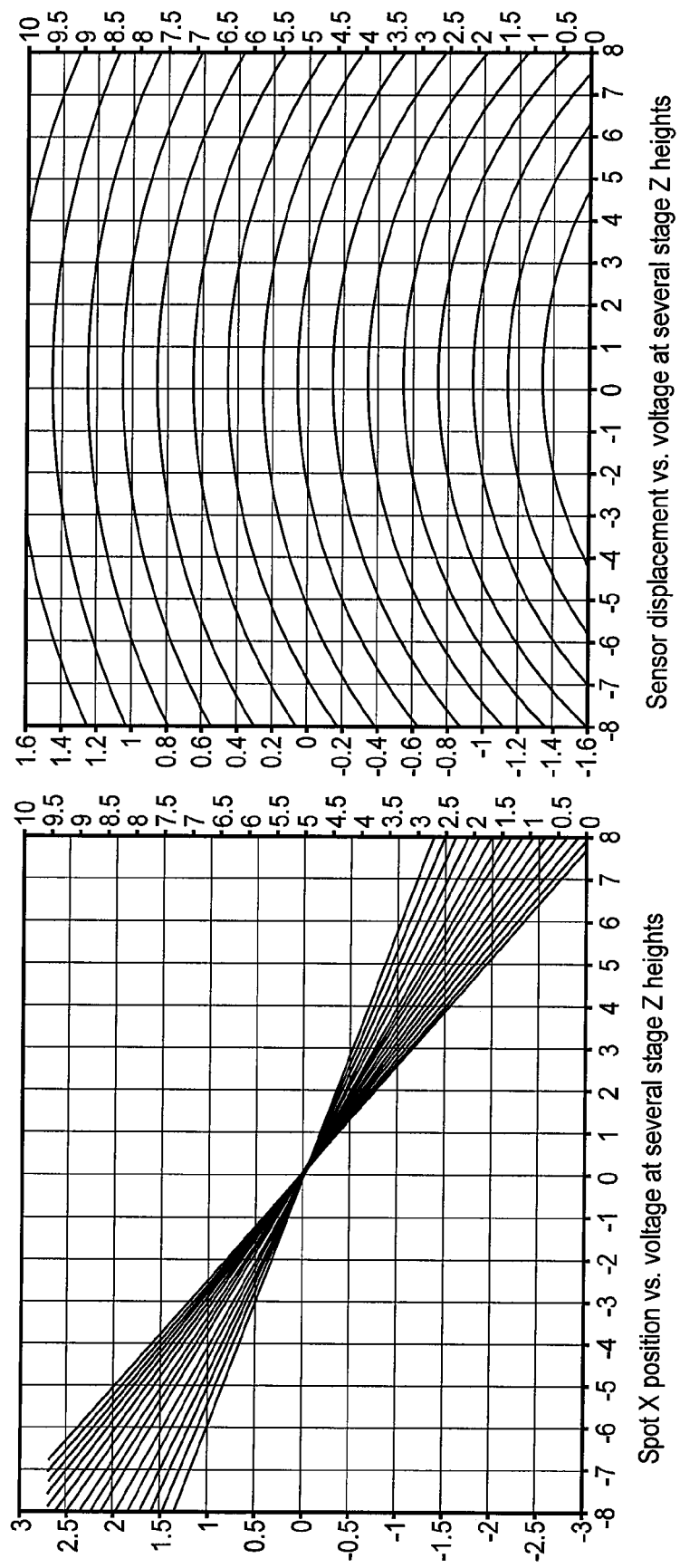
FIG. 16 depicts a graph showing the X position of a laser spot relative to voltage at varying Z heights during calibration of a measurement system under one embodiment of the invention.
FIG. 17 depicts a graph showing sensor displacement versus voltage at varying Z heights during calibration of a measurement system under one embodiment of the invention.

As shown in FIGS. 13 and 15, in step 422, a flat reference strip 424 may be affixed so that it substantially covers the camera 418. In step 426, the measurement module 302 may sweep the laser spot over the strip 424. The resulting output may comprise the path length through the mirror 322 to the strip surface 424 for a number of discrete input voltages. The z axis component 404 of the stage 406 may be used to adjust the height in the Z direction of the measurement module 302 to take a number of path length versus input voltage measurements. As shown in FIGS. 16 and 17, which show respectively the X position of the spot versus voltage at several Z heights (FIG. 16) and sensor displacement versus voltage at several Z heights (FIG. 17), the resulting data set may calibrate the path length in inches to the input voltage of the galvanometer at several z heights for that particular discrete measurement module 302. In step 427, curve fitting and point evaluation may be applied to the resulting data set for that particular discrete measurement module 302.

In step 428, the steps of 402 through 426 may be repeated to calibrate separately each of the three remaining three measurement modules 302 of the four measurement module system 300 of FIG. 10. This may be accomplished by independently attaching each of the four measurement modules of the system 300 of FIG. 10 to the moveable Z axis component 404 of the stage 406, and calibrating each of the four measurement modules of the system 300 one at a time. In such manner, all four measurement modules 302 of the four measurement module system 300 of FIG. 10 may be calibrated independently.

Figure 18:
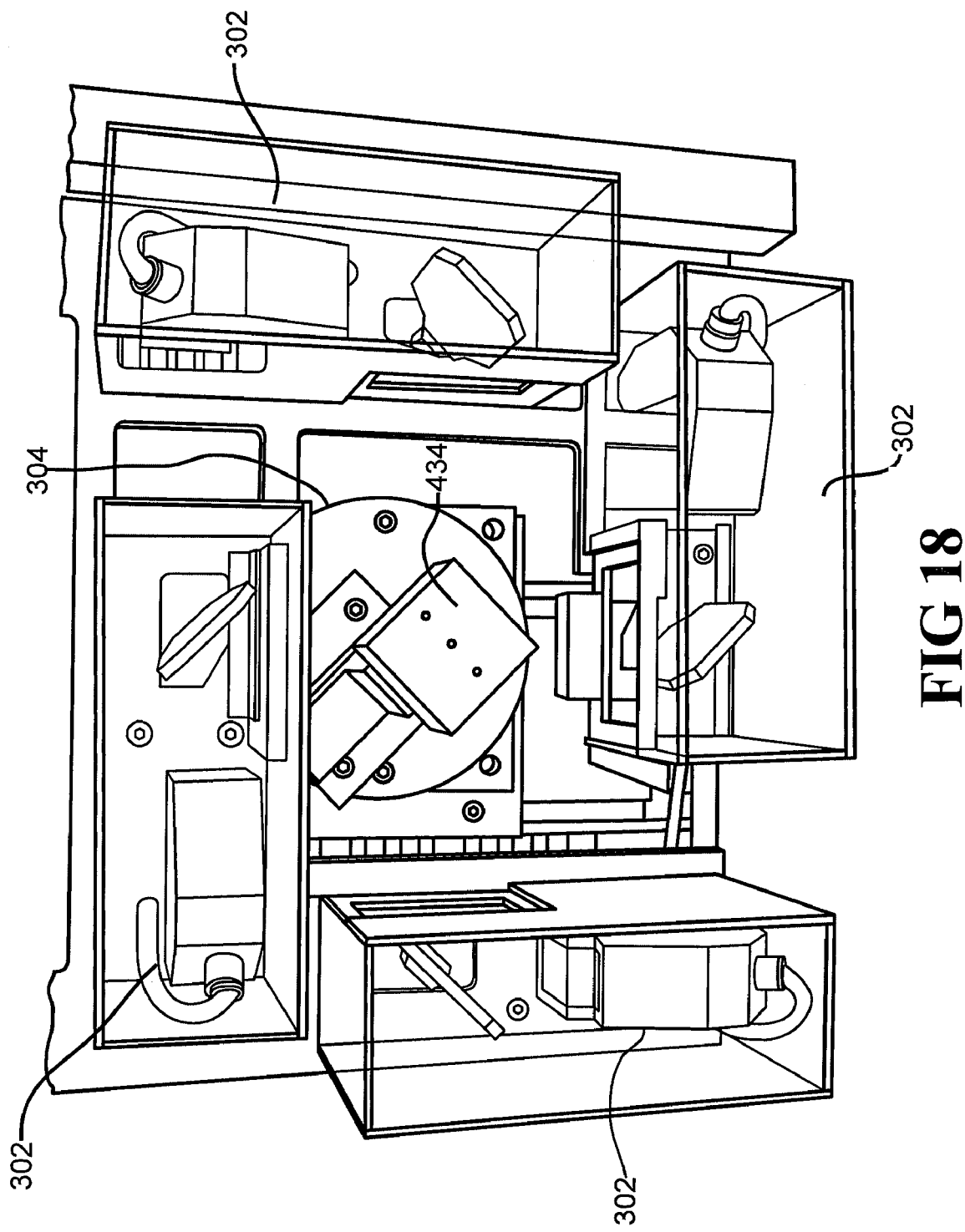
FIG. 18 depicts the mounting of a calibration cube in between four measurement modules during calibration of a measurement system under one embodiment of the invention.

In step 430, each of the four measurement modules 302 of the system 300 of FIG. 10 may be simultaneously attached to the array frame 304. In step 432, as shown in FIGS. 13 and 18, a calibration cube 434 with certified distances and angles may be mounted at the center of the array frame 304. In step 436, the four measurement modules 302 may scan the calibration cube 434. In step 438, the resulting points may be analyzed and the position and orientation of each calibration cube surface as measured by the four measurement modules 302 may be compared to the actual known dimensions of the measured surfaces of the calibration cube 434. Matrix transformations may be applied to the module data to rotate the individual module data sets so they measure the cube 434 correctly.

In step 440, subsequent scans (measurements) of the calibration cube 434 may be taken to produce data points that are in a common inch space. In such manner, the four measurement module system 300 may be calibrated. In other embodiments, the calibration method may be utilized to calibrate measurement systems having varying numbers, types, configurations, and locations of components. In still other embodiments, the steps of the calibration method may be altered and/or varied.

Figure 19:
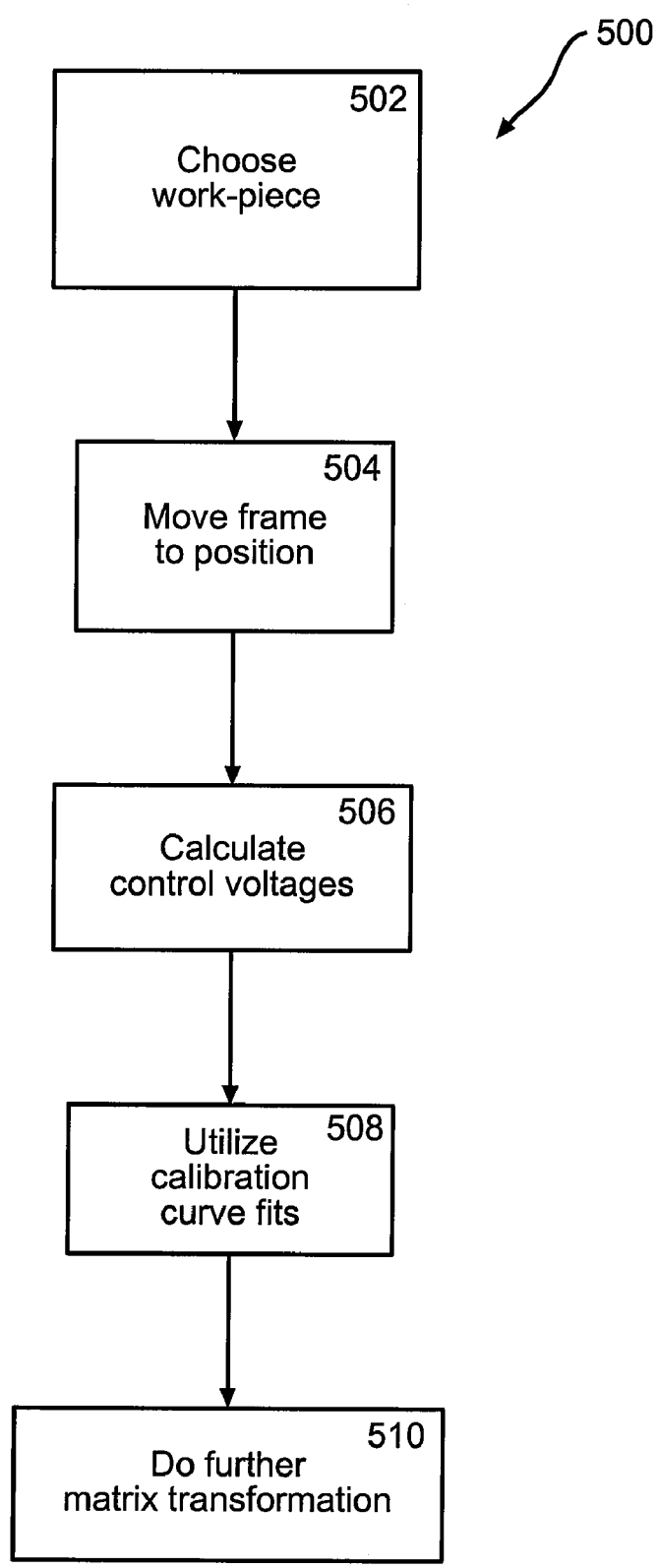
FIG. 19 depicts a flowchart of another embodiment under the invention for a method of use of a measurement system.

FIG. 19 depicts a flowchart 500 of another embodiment under the invention of a method of use of a measurement system. In one embodiment, the method may be utilized to measure a workpiece using the measurement system 300 of FIG. 10 after the system 300 has been calibrated using the calibration method of FIG. 13. In one step 502 of the method, a workpiece to be measured may be chosen. In another step 504, any desired cross section dimension of the workpiece may be measured by moving the measurement carriage frame 308 to the desired linear position and then activating the measurement cycle.

In step 506, the software running on computer 326 may calculate the control voltages necessary for each galvanometer of each of the four measurement modules 302 to sweep a line on the workpiece surface. The digital to analog voltage card 328 and the analog voltage to digital card 330 in the computer 326 may be synchronized so that when the four galvanometers of the four measurement modules 302 receive each discrete control voltage from the digital to analog card, the analog to digital card simultaneously measures the output voltage of the optical displacement sensor controllers 332. As a result, each incremental mirror movement of each of the four mirrors 322 may be matched to a voltage that represents the measured path length to the workpiece surface.

In step 508, the input voltages to the galvanometer controllers 336 and the resulting path length voltages from the optical displacement sensor controllers 332 may be evaluated using the calibration curve fits established during calibration. The evaluation process may produce measured workpiece surface points in inch coordinates. In step 510, a further matrix transformation of the four measurement module point sets may combine the points into a common inch space coordinate system. Further line fitting and line to line distance calculations may be performed and may result in measured workpiece dimensions for a circumference of the workpiece.

The invention may reduce one or more problems of one or more prior art measurement systems and/or methods. For instance, the invention may allow for measurements of workpieces to be done more efficiently, more timely, more economically, more automatically, more easily, and/or may reduce one or more other types of problems of one or more of the prior art measurement systems and/or methods.

It should be understood, of course, that the foregoing relates to exemplary embodiments of the invention and that modifications may be made without departing from the spirit and scope of the invention as set forth in the following claims.

We claim:

1. A system for measuring a workpiece comprising:
a plurality of measurement modules for being placed substantially around a circumference of said workpiece, wherein each of said measurement modules comprises at least one galvanometer, at least one mirror, and at least one optical displacement sensor, wherein said optical displacement sensors are for emitting a plurality of light beams towards said at least one mirror, said at least one mirror is for reflecting the emitted light beams onto the workpiece, said workpiece is for reflecting the mirror reflected light beams back towards said at least one mirror, said at least one mirror is for reflecting the workpiece reflected light beams towards said optical displacement sensors, and said optical displacement sensors are for receiving the mirror reflected light beams, wherein said measurement modules are for determining a measurement of said circumference of said workpiece based on said reflected light beams;
an electronic control module, wherein said electronic module comprises at least one computer which is adapted to control said galvanometers and said at least one mirror, and is also adapted to communicate with said displacement sensors; and
a moveable frame to which said measurement modules are attached, wherein said moveable frame is adapted to allow said measurement modules to be moved relative to the workpiece.

2. The system of claim 1 wherein said system comprises four measurement modules.

3. The system of claim 1 wherein said workpiece comprises a part of an aircraft.

4. The system of claim 1 wherein said measurement modules additionally comprise temperature sensors.

5. The system of claim 1 wherein said electronic control module further comprises a digital to analog voltage card, and an analog voltage to digital card.

6. The system of claim 1 wherein said electronic control module further comprises an optical displacement sensor controller, a temperature sensor controller, and a galvanometer controller.

7. The system of claim 1 further comprising a table, wherein said moveable frame is adapted to move relative to said table.

8. The system of claim 1 further comprising another computer attached to the moveable frame which communicates with the computer of the electronic control module.

9. The system of claim 1 wherein said plurality of measurement modules are oriented to form at least one of a substantially square, rectangular, and circular shape.

10. A method of measuring a workpiece comprising:
providing a plurality of measurement modules, wherein each of said measurement modules comprises at least one galvanometer, at least one mirror, and at least one optical displacement sensor;
placing said measurement modules substantially around a circumference of said workpiece;
emitting a plurality of light beams onto the workpiece using said measurement modules;
reflecting said light beams off said workpiece; and
determining a measurement of said circumference of said workpiece based on said reflected light beams, wherein at least one of: (a) said light beams are emitted from said optical displacement sensors, reflected off said at least one mirror, reflected off said workpiece, reflected back off said at least one mirror, and reflected back to said optical displacement sensors; and (b) the step of determining a measurement of said circumference of said workpiece comprises evaluating path length voltages of the optical displacement sensors and input voltages of the galvanometers.

11. The method of claim 10 wherein four measurement modules are provided.

12. The method of claim 10 wherein said workpiece comprises a part of an aircraft.

13. The method of claim 10 wherein each of said measurement modules emits a light beam onto substantially different areas of said circumference of said workpiece.

14. The method of claim 10 wherein calibration curves may be utilized to determine said measurement of said circumference.

15. The method of claim 14 wherein said measurement of said circumference is determined in inch space coordinates.

16. The method of claim 10 further comprising the steps of moving said measurement modules relative to said workpiece and determining additional circumference measurements of said workpiece.

17. A method of calibrating measurement modules for measuring a workpiece comprising:
attaching a single measurement module to a moveable component, wherein said single measurement module comprises at least one galvanometer, at least one mirror, and at least one optical displacement sensor,
directing a laser spot emitted from said sensor off said at least one mirror and into a camera;
rotating said at least one mirror using said galvanometer to redirect said laser spot;
moving said single measurement module into multiple configurations relative to said camera;
determining spot positions where said laser spot hits said camera at each of said multiple configurations;
calibrating said spot positions relative to input voltages of the galvanometer at each of said spot positions;
sweeping said laser spot over a reference piece;
determining path lengths of the laser spot to the reference piece for varying input voltages; and
calibrating said path lengths relative to said varying input voltages.

18. The method of claim 17 further comprising repeating the steps of claim 17 on additional discrete measurement modules.

19. The method of claim 18 further comprising the step of simultaneously attaching each of the calibrated measurement modules to said moveable component.

20. The method of claim 19 further comprising placing a calibrated part within said calibrated measurement modules.

21. The method of claim 20 further comprising the steps of measuring the calibrated part using said calibrated measurement modules, and comparing the resultant measurements with known measurements of the calibrated part.

22. The method of claim 21 further comprising the step of applying matrix transformations to the resultant measurements in order to produce measurements of the calibrated part which are substantially the same as the known measurements of the calibrated part.

23. The method of claim 17 further comprising the step of measuring a workpiece using the calibrated measurement modules.

* * * * *